United States Patent [19]

Lutz et al.

[11] 4,169,411

[45] Oct. 2, 1979

[54] STACK-FORMING MACHINE HAVING SPRING-POWERED, PRESS-CONTROLLED TAILGATE

[75] Inventors: Bruce L. Lutz, Hesston; Richard J. Buller, Newton, both of Kans.

[73] Assignee: Hesston Corporation, Hesston, Kans.

[21] Appl. No.: 893,280

[22] Filed: Apr. 5, 1978

[51] Int. Cl.² ............................................. B30B 5/00
[52] U.S. Cl. ..................................... 100/255; 56/344; 100/100; 100/270
[58] Field of Search ............... 100/100, 245, 255, 218, 100/270; 56/344, 346; 214/508, 522

[56] References Cited

U.S. PATENT DOCUMENTS

| | | | |
|---|---|---|---|
| 3,691,741 | 9/1972 | White | 56/344 |
| 3,732,672 | 5/1973 | Adee | 56/344 |
| 3,842,732 | 10/1974 | Anderson | 100/270 |
| 3,901,142 | 8/1975 | Wood | 100/255 |

*Primary Examiner*—Billy J. Wilhite

*Attorney, Agent, or Firm*—Schmidt, Johnson, Hovey & Williams

[57] ABSTRACT

A stack-forming machine has a telescoping container defined by a vertically reciprocable, downwardly concave press that is received within an upwardly concave lower section that remains stationary during reciprocation of the press. When the press is raised and an upper door on the press and a lower gate on the lower section are opened, the stack may be discharged from the container. The upper door is normally held closed by an overlapping portion of the lower gate, the latter in turn being releasably latched in place, and while the lower gate is swung downwardly by gravity to its opened position as the press is raised, the upper door is powered to its open position through linkage that interconnects the door with the lower section of the container so as to utilize the upward movement of the press as the source of opening power for the door. Included within the linkage is a coil spring that permits the upper door to be held closed by the lower gate when the latter is latched, notwithstanding reciprocation of the press at periodic intervals during the stack-forming cycle.

8 Claims, 5 Drawing Figures

STACK-FORMING MACHINE HAVING SPRING-POWERED, PRESS-CONTROLLED TAILGATE

TECHNICAL FIELD

This invention relates to crop harvesters of the type which produce machine-made stacks of loose hay. More particularly, it relates to a way of controlling the opening and closing of doors or gates on such harvesters so as to maintain the same closed during stack formation but to render the same opened for stack discharge.

BACKGROUND ART

Harvesters of this type typically have a telescoping container within which the stack is formed. One part of the container is comprised of an upper vertically reciprocating press, while the other part is comprised of a lower stationary section that telescopically receives the press. Completed stacks are discharged out the rear end of the container when the press is raised to its fullest extent at the completion of the forming process. While the rear end of the container must thus be open at the time of stack discharge, it is essential that it be closed during stack formation in order to prevent the material being compressed within the container from escaping during that action.

One way of achieving this objective has been to provide a door on the upper press which hangs in a suspended manner from an upper pivot point on the press. A cooperating gate on the lower section is hinged to the latter at the bottom of the gate and forms a ramp down which the stack may slide when the gate is fully opened. By having the gate overlap the suspended door adjacent the bottom of the latter, a single latch may be utilized in connection with the gate to maintain both the gate and the door closed during the forming process. Gravity may then be used to open the lower gate at the time of stack discharge, and the upper door may simply be allowed to swing upwardly and outwardly under the impulse of the discharging stack if so desired.

Where the stack itself is utilized to lift the upper door, the door can have a tendency to drag along the top of the stack and disturb the carefully prepared "crown" which is so contoured as to readily shed moisture instead of allowing it to penetrate deeply into the stack and spoil the hay. One way of alleviating this problem has been to employ one or more coil springs anchored to the door on the one hand, and the press itself on the other, so as to assist the stack in raising the door, the strength of the springs not being sufficient in and of themselves to power the door to its opened position.

Another alternative is illustrated in U.S. Pat. No. 3,901,142, in the name of Wood, which discloses a rather complex system of levers, bars, cranks, straps and other components so arranged that the upper door is cranked open as the press is raised from its lowermost position.

SUMMARY OF INVENTION

It has been found that while it may be desirable to lift the upper door entirely off the discharging stack to avoid disruption of the crown thereof as above-explained, at the same time it is also important to avoid complicated apparatus for achieving this result because such complexity simply increases the likelihood of mechanical failure, increases the overall cost of the machine, and in the end, is likely to result in a disgruntled owner of the machine. Hence, the present invention contemplates the simple expedient of mechanically linking the upper door with the lower section of the container so that when the press is raised, the door is likewise swung to its opened position in order to maintain the same effective distance between the anchor point of the linkage on the door and the anchor point of the linkage on the lower section. In order to permit this effective length to be increased, however, which occurs anytime the door is held closed while the press reciprocates, a tension spring is utilized between the opposite ends of the linkage so as to stretch to its fullest length as the press rises. The lower gate, inasmuch as it is latched and overlaps the lower end of the door at this time, maintains the upper door fully closed, notwithstanding the energy which becomes stored in the spring by the rising press.

DETAILED DESCRIPTION

Figure 1:
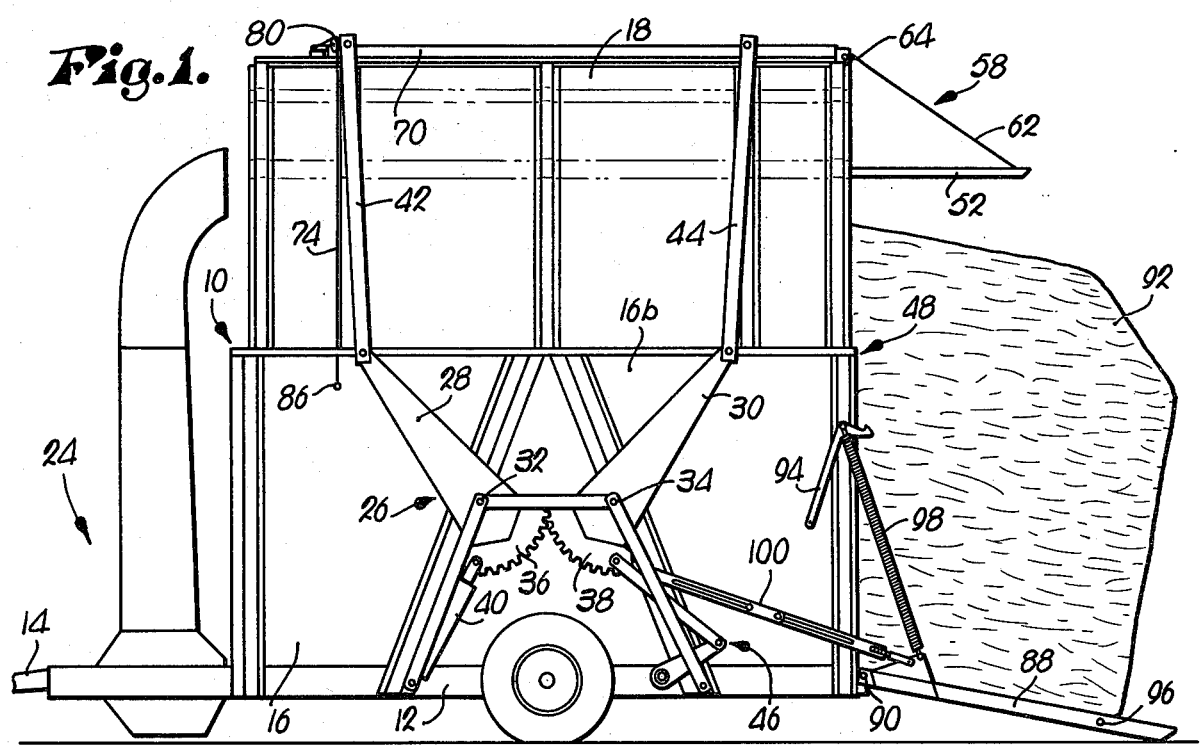
FIG. 1 is a side elevational view of a stack-forming machine utilizing a door control arrangement constructed in accordance with the principles of the present invention.

The stack-forming machine includes a vertically telescoping container 10 mounted on a wheeled chassis 12 that has a forwardly extending tongue 14 adapting the stack-forming machine for connection with a towing vehicle (not shown). The telescoping container 10 comprises two basic parts, i.e., an upwardly concave lower part 16 fixed to the chassis 12, and a vertically reciprocating upper part 18 that telescopes into and out of the lower part 16 and is of generally upwardly arched configuration so as to be downwardly concave. The upper part 18 serves as a press for materials which accumulate within the container 10, as will hereinafter be made apparent.

Figure 3:
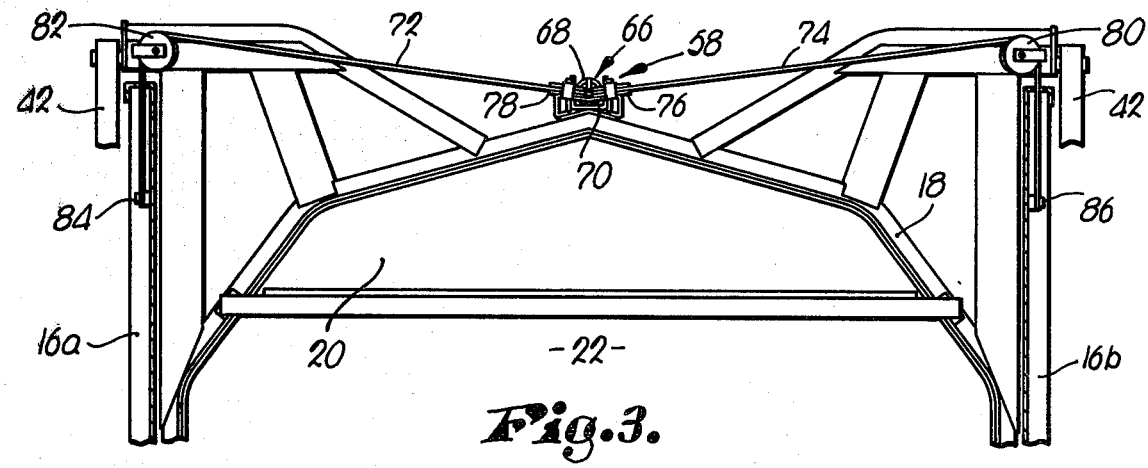
FIG. 3 is a fragmentary elevational view of the machine taken from the normally front end thereof.

The lower part 16 is closed at its front end, while the upper part 18 is open, except for the gable 20, as illustrated in FIG. 3. Thus, below the gable 20 there is defined a large inlet 22 into the container 10 when the press is fully raised as in FIG. 1, and through this inlet 22 crop material may be blown by the pickup mechanism 24 having a high-speed, spinning rotor (not shown) at its lower end that lifts crop material off the ground as the machine advances along a windrow and propels the same upwardly and rearwardly into the container 10 through the aid of an induced airstream.

The press part 18 is reciprocated vertically by a pair of identical actuating assemblies 26 on opposite sides of the container 10, only one of such assemblies 26 being illustrated. Each assembly 26 includes a pair of beams 28 and 30 swingably mounted on the side of the lower part 16 by respective pivots 32 and 34, and having intermeshing gear teeth 36 and 38 at their lower ends for synchronizing the swinging movement thereof. A single hydraulic cylinder 40 interconnecting one of the beams 28 and the chassis 12 supplies driving power for the beams 28 and 30. A pair of vertically extending straps 42 and 44 connect the opposite ends of the beams 28 and 30, respectively, with the press part 18 adjacent the top of the latter so as to operate press part 18 in response to swinging of the beams 28, 30. Synchronizing apparatus 46 interconnects the beam 30 of one assembly 26 with the corresponding beam 30 on the opposite side of the container 10.

The rear of the container 10 has a stack discharge outlet that is broadly denoted by the numeral 48 and is cooperatively defined by the open end of the press part 18 below a rear gable 50 and by the open end of the lower part 16 above the chassis 12. This outlet 48 is opened or closed in part by an upper door 52 that is suspended from the rear end of the press part 18 by a pair of horizontal, transversely extending pivots 54 and 56 so that the door 52 is swingable between a closed position, illustrated in solid lines in FIG. 5, and an opened position, illustrated in phantom lines in FIG. 5 and in solid lines in FIG. 1. A control for the door 52, broadly denoted by the numeral 58, powers the door 52 to its opened position and allows the same to return to its closed position by gravity, all in conjunction with raising and lowering of the press part 18.

The control 58 broadly includes linkage 60 that interconnects the door 52 with the lower part 16 of the container 10 in such a way that the press part 18 is mechanically introduced between the opposite ends of the linkage 60 so as to raise and lower the door 52 in accordance with movement of the press part 18. The linkage 60 includes a cable stretch 62 anchored at one end to the outer end of the door 52 and extending upwardly and forwardly therefrom around a guide pulley 64 mounted at the apex of the press part 18 at the rearmost central point thereof, the cable stretch 62 likewise being centered with respect to the door 52. The opposite end of the cable stretch 62, beyond the pulley 64, is attached to relief means 66 in the nature of a coil tension spring 68, which extends along the apex of the press part 18 in a fore-and-aft direction substantially centered between the opposite sides thereof. A transversely U-shaped, upwardly opening channel 70 receives the spring 68 and contains the same during expansion and contraction thereof, as will hereinafter become apparent.

The forward end of the spring 68 is attached to a pair of cable stretches 72 and 74, respectively, which extend forwardly through the remainder of the channel 70, and loop around opposite ones of a pair of guide pulleys 76 and 78 attached to the press part 18. From pulleys 76, 78, the cable stretches 72, 74 diverge laterally and loop around respective ones of another pair of guide pulleys 80 and 82 adjacent the upper, lateral extremities of the press part 18. From the pulleys 80, 82, the cable stretches 72 and 74 extend downwardly to individual anchor points 84 and 86 fixed to opposite sides 16a and 16b, respectively, of the lower part 16.

Figure 5:
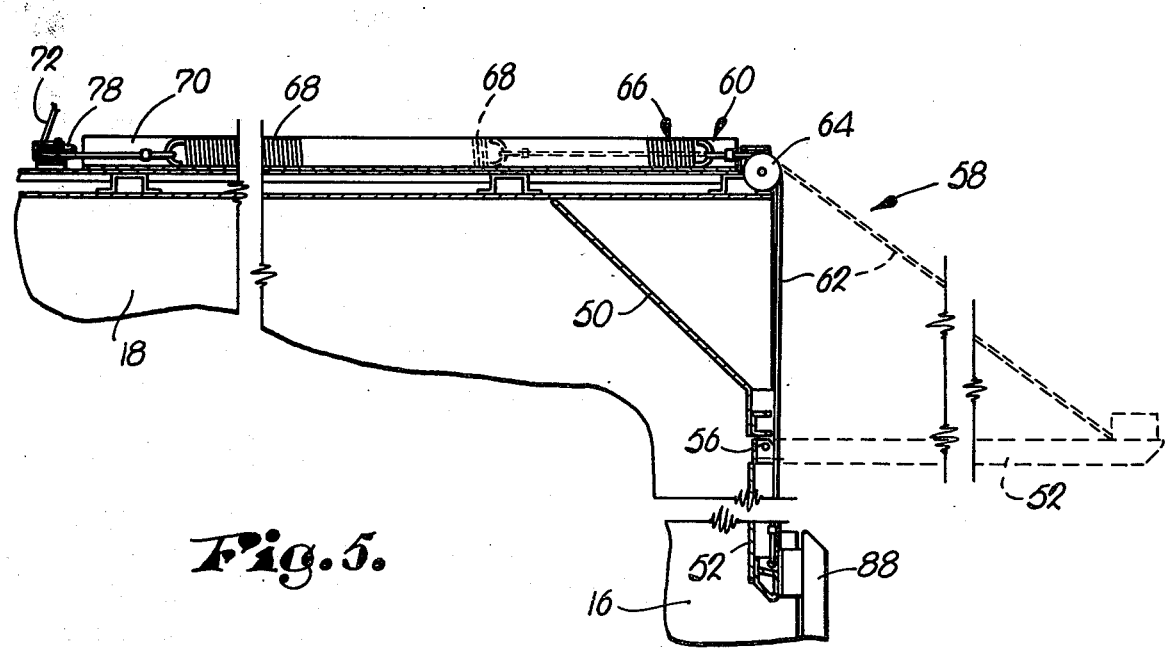
FIG. 5 is a fragmentary, cross-sectional view of the machine with the press fully raised, the solid line position of the upper door indicating its closed position, while the dotted line position corresponds to its opened condition.

The bottom portion of the outlet 48, as defined by the open rear end of the lower part 16, is opened or closed by a gate 88 hinged to the bottom part 16 by pivot 90 for swinging movement between an opened position, as illustrated in FIG. 1, and a closed position, as illustrated in FIG. 5. In the opened position, the gate 88 serves as a ramp for the discharging stack 92, as shown in FIG. 1, while in the closed position, the gate 88 overlaps the lowermost end of the door 52, as illustrated in FIG. 5, such that the gate 88 may serve as a means for keeping the door 52 in its closed position. A releasable latch 94 at the rear of the lower part 16 may be used to engage a pin 96 on the gate 88 and thereby hold the latter closed, there being a spring 98, if desired, between the part 16 and the gate 88 so as to check the descent of the gate 88 during opening and to assist in raising the latter to its closed position after stack discharge. In this regard, an extensible link 100 interconnects the beam 30 and the gate 88 so as to harmlessly extend and retract during reciprocation of the press part 18 when the gate 88 is held closed by the latch 94, but to pull against the gate 88 and allow the same to be gently lowered to the ground when the link 100 is at the limits of its extension and the beam 30 is rotated in a direction to raise the press part 18 when the latch 94 is released.

OPERATION

As the container 10 is being towed along a crop windrow during the stack-forming process, the press part 18 is normally fully raised, as illustrated in FIG. 1, but the door 52 is held closed by the gate 88, as illustrated in FIG. 5, the latch 94 in turn holding the gate 88 in its closed position. Crop material is picked up by the mechanism 24 and blown rearwardly into the container 10 until the latter is substantially filled, at which time forward motion of the container 10 is halted and the press part 18 is pulled downwardly by actuating assemblies 26 so as to compress the accumulated crop material downwardly toward and into the lower part 16 of the container 10. Reversing the assemblies 26 raises the press part 18 to its original position, whereupon advancement of the container 10 may be recommenced. Additional crop material may then be loaded into the container 10 on top of that already compressed until such time as the container 10 is once again filled, whereupon the pressing cycle is repeated. This sequence of steps is repeated several times over until the compressed crop material reaches the desired "full-size" height.

Once a full-size stack has been formed, and with the press part 18 preferably down resting upon the top of the completed stack, the operator may release the latch 94 through a cable or the like (not shown) which permits the coil spring 98, coupled with rearward pressure of the compressed stack, to pop the gate 88 open to the extent permitted by the link 100, which, with the press part 18 down, will be extended almost to its full length. Thereupon, by actuating the assemblies 26 to raise the press part 18, the extended link 100 will progressively allow the gate 88 to swing outwardly and downwardly toward the ground until it finally assumes the position illustrated in FIG. 1 with the press part 18 fully raised.

Unlatching of the gate 88 also has the effect of releasing the upper door 52, at least to the extent permitted by the gate 88. Once the latter has fully cleared the door 52, further raising of the press part 18 causes the linkage 60 to progressively swing the door 52 outwardly and upwardly toward the position illustrated in phantom lines in FIG. 5 and in full lines in FIG. 1. When the gate 88 and the door 52 are thus fully opened, the stack 92 may be discharged by any suitable mechanism within the container 10.

After the stack 92 has been fully discharged, lowering of the press part 18 by the assemblies 26 will cause the linkage 60 to permit the upper door 52 to swing by gravity in a downward and inward direction toward its closed position. Simultaneously, the link 100 draws the gate 88 upwardly and inwardly toward its closed position, the arrangement being such that the door 52 reaches its closed position before the gate 88 is fully raised, such that the gate 88 overlaps the lower end of the door 52 upon relatching of the latch 94 on the pin 96.

Figure 2:
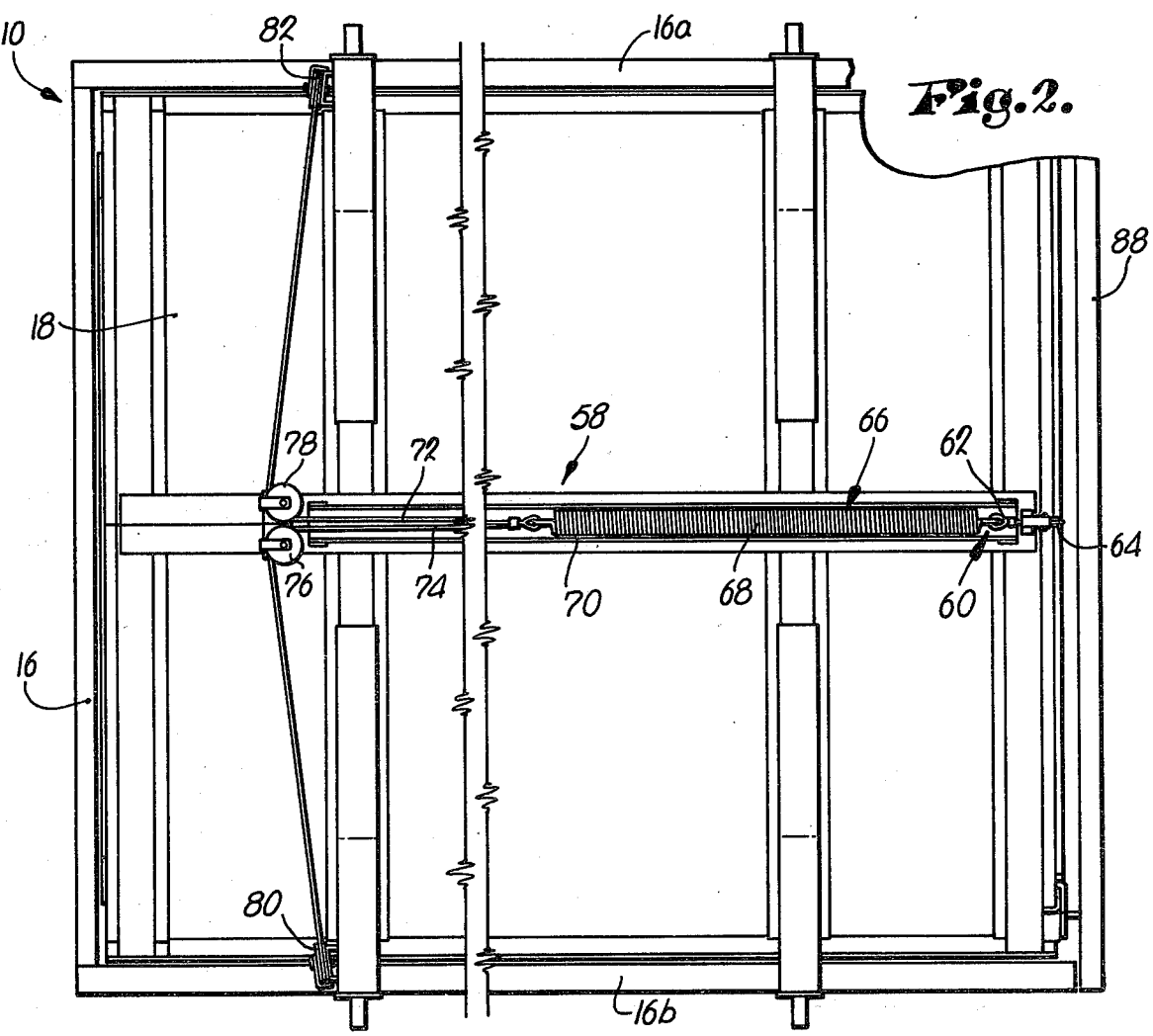
FIG. 2 is an enlarged, top plan view of the machine when the press is lowered, certain components of the machine being eliminated for clarity.
Figure 4:
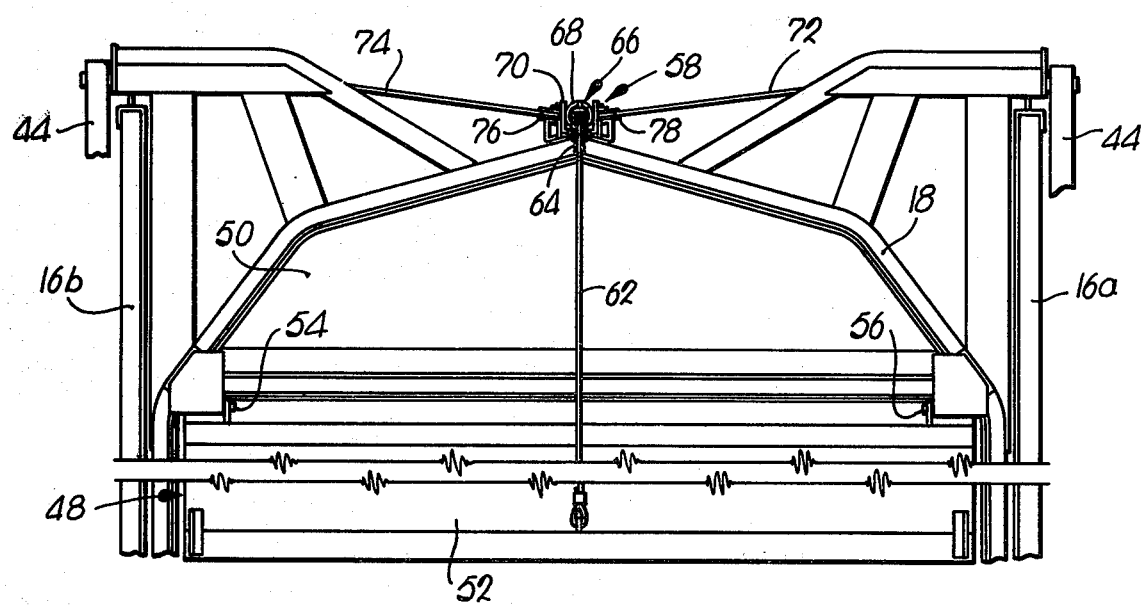
FIG. 4 is a fragmentary elevational view of the machine taken from the normally rear end thereof.

It is important to note that although the linkage 60 operates to raise and lower the door 52 in response to raising and lowering of the press part 18, the relief spring 68 of the linkage 60 permits the door 52 to be held closed by gate 88 during the stack-forming cycle, notwithstanding reciprocation of the press part 18. To this end, when the press part 18 is fully down, as illustrated in FIGS. 2, 3 and 4, the distance between the anchor points 84, 86 of the linkage 60 and the opposite anchor point on the door 52 is at its minimum length; thus, the spring 68 is relaxed, as illustrated in FIG. 2. On the other hand, as the press part 18 is raised to its highest point, as illustrated in FIG. 1, the distance between opposite ends of the linkage 60 increases, thereby causing the spring 68 to stretch until it extends virtually the entire length of the confining channel 70, as illustrated in FIG. 5. Hence, although the linkage 60 operates in a way to take advantage of the rising press part 18 to forcibly open the door 52, it also has the inherent ability to permit the door 52 to be held closed during those times that closure is required.

We claim:

1. In a machine wherein a crop stack is formed within a container having an outlet through which the stack may be discharged upon completion of the stack-forming process, and further having a door carried by one part of a pair of relatively telescoping parts comprising said container, said door being shiftable between opening and closing positions with respect to said outlet, a control for said door comprising:

means operably linking said door with the other part of said container for causing said shifting of the door in response to said telescoping of the parts, said linking means maintaining a continuous interconnection between said door and said other part of the container throughout all telescoping of the parts, including that telescoping which occurs when the door is held in its closing position, said linking means including relief means disposed for permitting said door to be selectively held in said closing position notwithstanding said telescoping of the parts.

2. In a machine as claimed in claim 1, wherein said linking means further includes a flexible cable connected to said relief means.

3. In a machine as claimed in claim 2, wherein said relief means includes a coil spring.

4. In a machine as claimed in claim 1, wherein said one part is movable during said telescoping while said other part remains stationary, said one part comprising a press for the crop materials within the container.

5. In a machine as claimed in claim 4, wherein said other part is provided with a gate cooperable with said door for rendering said outlet opened and closed, said gate being shiftable between opening and closing positions with respect to said outlet and being disposed for overlapping said door in a manner to prevent said shifting of the door out of said closing position thereof when the gate is held in its said closing position.

6. In a machine as claimed in claim 5, wherein said one part is vertically reciprocable during said telescoping and is disposed generally above said other part, said door being suspended from said one part for swinging movement in a generally outward and upward direction during shifting to its opening position and in a generally downward and inward direction during shifting to its closing position, said gate being mounted on said other part for swinging movement in a generally outward and downward direction during shifting to its opening position and in a generally upward and inward direction during shifting to its closing position.

7. In a machine as claimed in claim 6, wherein said linking means includes a flexible cable and a coil spring connected to said cable, said coil spring comprising said relief means.

8. In a machine as claimed in claim 7, wherein said cable includes a first stretch extending from said door to said spring and a pair of second stretches extending from said spring to said other part, said spring extending along said one part substantially midway between a pair of opposite sides thereof and said second stretches diverging from said spring to said opposite sides and to corresponding opposite sides of said other part.

* * * * *